United States Patent Office.

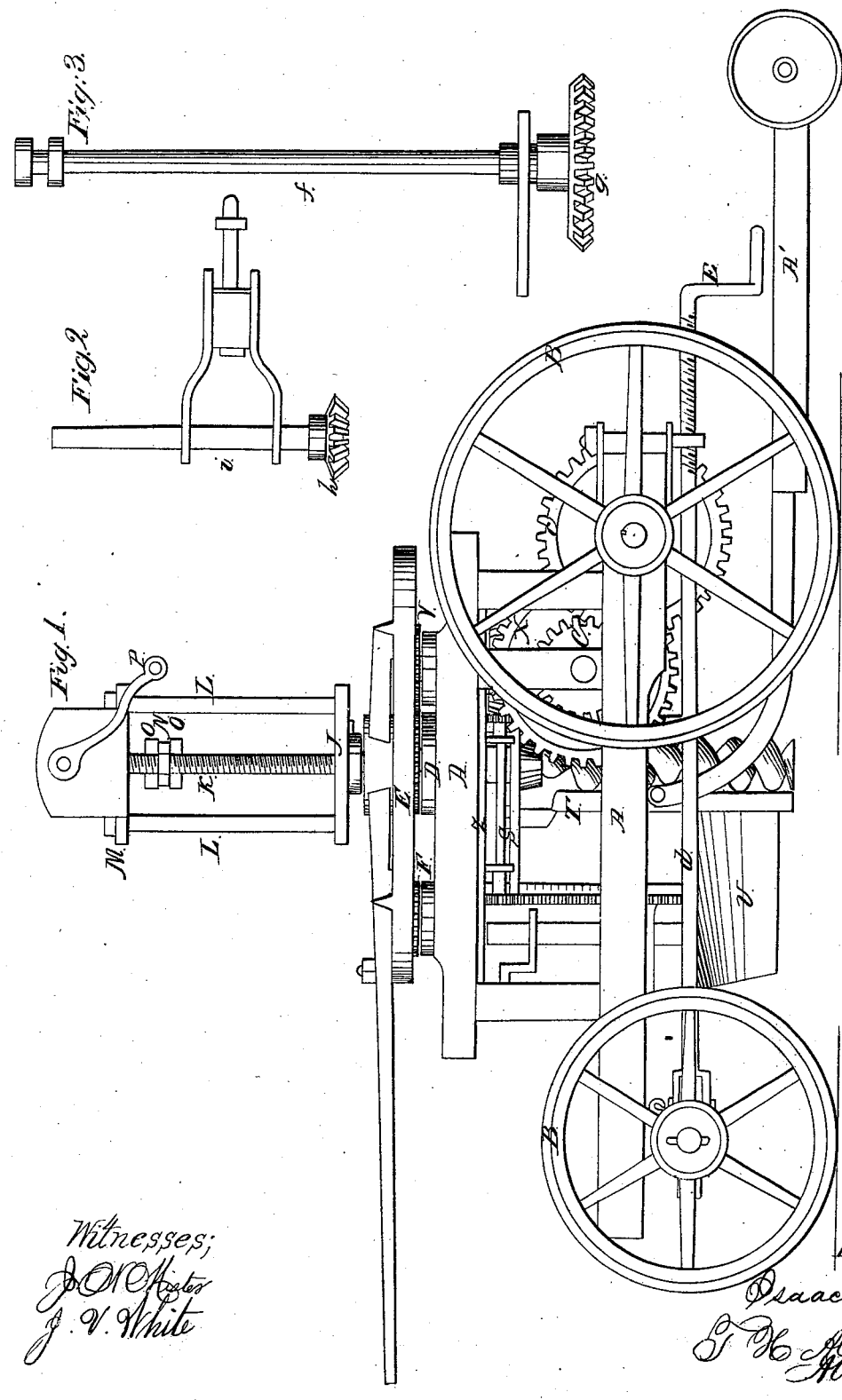

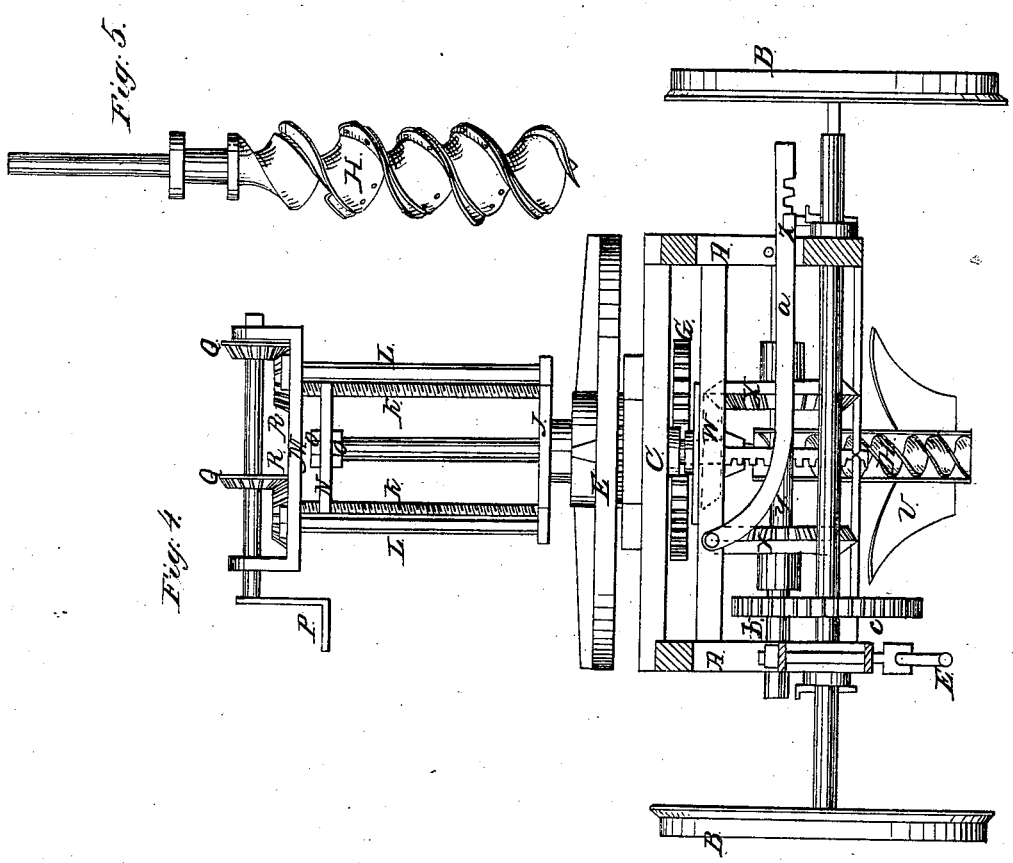

ISAAC B. JONES, OF XENIA, OHIO.

Letters Patent No. 82,846, dated October 6, 1868.

---

COMBINED DITCHING AND BORING-MACHINE.

---

The Schedule referred to in these Letters Patent and making part of the same.

---

TO ALL WHOM IT MAY CONCERN:

Be it known that I, ISAAC B. JONES, of Xenia, in the county of Greene, and State of Ohio, have invented certain new and useful Improvements in Combined Horse-Power Ditching-Machine and Post-Hole Borer; and I do hereby declare that the following is a full, clear, and exact description thereof, reference being had to the accompanying drawings, and to the letters of reference marked thereon, which form a part of this specification, and in which—

Figure 1 is a side view,

Figure 4 a front view,

Figure 5 a side elevation of the auger, and

Figures 2 and 3 represent parts which may be used in connection with the ditcher.

The nature of my invention consists in the construction and general arrangement of a ditching-machine, which will be hereinafter more fully set forth, in order to enable others skilled in the art to make and use the same.

A represents a frame, made of suitable material and dimensions, which frame is mounted upon four wheels, B B.

On top of this are three cross-ties, C, on the centre one of which the hollow spindle, D, is firmly bolted, and upon this the master-wheel E revolves. This wheel has cogs on its inner side, and its hub is also provided with cogs on the lower side, forming a pinion on the same.

A shaft passes through one of the outer cross-ties C, which shaft has at its upper end a pinion, F, gearing into the cogs on the master-wheel, and on its lower end the speed-wheel G is secured.

The speed-wheel G meshes with a pinion on the under side of the centre tie, through which pinion the shank of the auger H passes up, and also through the hollow spindle D.

The shank of the auger has a groove cut through its entire length, and the pinion, through which it passes, is provided with a feather or lug, working in this groove, thus permitting the shank to pass up and down through the same, but preventing the pinion from turning without the shank, so that the motion of the master-wheel revolves or turns the auger.

The pinion mentioned, below the centre cross-tie, is held up by a metal plate, I.

The top of the hollow spindle D, immediately above the master-wheel E, is turned down, forming a shoulder, on which a platform, J, is placed, and firmly fastened in a horizontal position.

This platform has two adjustable blocks, which hold in position two upright screws, K K. Four hollow posts, L L, are placed in a vertical position on the platform J, one in each corner, on which posts the cap M rests. Bolts passing through the platform, posts, and cap, with nuts at their upper ends, secure the whole firmly together.

The cap M is similar to the platform J, having also two adjustable blocks, holding the upper ends of the screws in position. A double nut, N, which consists of a piece of iron, with a nut formed at each end, at proper distance apart, works up and down on the screws K K. This nut has a hole in the centre, which receives the upper end of the auger-shank, and by means of one washer, O, above, and one below, the nut on the shank prevents the auger from moving up or down unless the screws are turned, which in that case carry the nut and auger up or down, as desired.

This is done by a shaft and crank, P, mounted on the cap M, two mitre-wheels, Q Q, meshing with two pinions, R R, on the upper ends of the screws, as seen in fig. 4.

Immediately above the pod of the auger H is a cross-head, S, held in position on the auger-shaft by washers, or other suitable means. This cross-head moves with the auger on slides, one in front and one in rear of the auger. In rear of the point where the auger-shank passes through the cross-head, a sheath, T, is firmly bolted, so as to remain at proper distance from the auger, and which sheath forms one-half of the hole for ditching.

To prevent the cross-head from tipping when the pressure of dirt comes against the sheath T, there is a shaft placed in ears on the upper side of the head, which shaft has a pinion on each end, said pinions working in rack-bars attached in a vertical position to the slides mentioned.

Behind the sheath T is a double mould-board, U, with arms extending from each side of the sheath, which serves to carry the dirt out sufficiently far to prevent it from falling into the ditch again. This mould-board works up and down on a slide, to suit uneven surfaces.

The auger has a cutting-edge at the lower end, and along the pod the edge is sharpened and turned up through its entire length, or as shown in fig. 5. This cutting-edge along the pod may be made separate, in sections, the outer edge of these sections being made sharp, and turned up. These sections may be easily taken off and sharpened, or, if one is broken, replaced by a new one, without the expense of a whole new auger.

On the other outer cross-tie, C, the feed-wheel, V, is placed, gearing into the pinion on the hub of the master-wheel, the shaft to this feed-wheel passing through the tie, and being on its lower end provided with a mitre-wheel, W, which gears into one of the mitre-wheels, X X. These latter are placed on a movable shaft, Y, which has its bearings in the frame A, and are so arranged that when a lever, Z, attached to one end of said shaft, is moved out or in, it throws either one or more of the wheels X X in gear with the mitre-wheel W.

On the shaft Y is a pinion, $b$, meshing with a wheel, $c$, on the axle, to the two front wheels B B, so that when the lever Z, which is held by a notched latch, $a$, is placed in the middle notch on said latch, the movement of the auger is not communicated to the wheels, the machine consequently standing still. When the lever is placed in the outside notch, the machine moves forward, and when in the inside notch, it moves backward.

When it is desired to operate the machine, a horse is hitched to a lever, on the master-wheel E, and started. The operator then, with the crank P, gradually runs the auger down to the depth desired, where it remains.

The machine, feeding forward, presses the auger tight to the bank, and with its cutting-edges keep a continuous cutting from bottom to top, and the sheath T, following it up, acting as the back part of the hole, makes a constant rush of dirt to the top of the ground, which the double mould-board U keeps from getting back again into the ditch.

A travelling-bridge, A', follows the machine, (in the drawings it is shown as being in front,) spanning both the dirt and ditch, for the horse to pass over. This bridge is provided with arms, which hook into eye-bolts on the inside of the frame A.

The course of the machine is directed to the right or left by cutting the hind wheels by means of a rod, $d$, connected to the side of the hind axle, with a swivel-arrangement, and the other end, on which a screw is cut, passes to the front of the machine, and is held in its place by a bolt passing up through plates fastened to the front end of one of the lower sills of the frame A. The head of this bolt is flat, and forms a nut for the screw-end of the rod $d$ to work in. On the end of the said rod, outside this nut, is a crank, $e$. By turning this crank, the hind wheels are cut so that the machine will turn either to the right or left, as may be desired.

This machine may be used for a variety of purposes besides that of ditching. To cut post-holes, it is only necessary to remove the sheath T, and place the lever Z in the middle notch of the latch $a$, the horse started, when the auger will turn around without moving the machine. With the crank P, the augur is lowered to the desired depth, all the dirt removed, when the auger is again raised. It is then only necessary to move the lever Z to the outer notch on the latch, when the machine moves forward to the place for the next hole, where the same operation is gone through as before.

Wells may be dug by having an auger of sufficient length.

It is invaluable as a subsoiler. For that purpose, the mould-board as well as the sheath is removed, the machine started forward the same as for ditching, the auger run down as deep as desired, and is kept by the machine pressed close to the bank, but the sheath not being there to occupy the ditch, it cuts the dirt perfectly fine, turns it around, and leaves it in the ditch immediately behind it, making no show on the surface except a little rise of pulverized earth.

My machine can also be changed to a horse-power by removing the auger-shaft, and another shaft, with a mitre-wheel at its lower end, substituted; this mitre-wheel to be thrown in gear with another wheel on a small shaft, secured to the sill of the machine near its centre, the end of which shaft is squared to receive a tumbling-shaft, and the horse-power is complete.

Having thus fully described my invention, what I claim as new, and desire to secure by Letters Patent, is—

1. In combination with a ditching-machine, the auger H, constructed as described, in whole or in sections, with a cutting-edge at the lower end, and the edge along its pod turned up and sharpened, substantially as and for the purposes herein set forth.

2. The combination of the cogged hub of the master-wheel E, feed-wheel V, and mitre-wheel W, for the purpose of communicating motion to the wheels B B, substantially as herein set forth.

3. In a combined boring and ditching-machine, the shaft Y, mitre-wheels X X, pinion $b$, and wheel $c$, in combination with the lever Z and notched latch $a$, substantially as herein set forth.

4. The combination of the auger H, sheath T, and mould-board U, all constructed as described, and operating substantially as and for the purposes herein set forth.

5. The screw-rod $d$, provided with a crank, $e$, at one end, and attached to the axle of the hind wheels, for the purpose of turning the machine to the right or left, substantially as herein set forth.

6. The arrangement of the movable cross-head S, provided with a shaft and pinions, as described, and operating on rack-bars and slides on each side of the auger H, substantially as and for the purposes herein set forth.

In testimony that I claim the foregoing as my own, I affix my signature in presence of two witnesses.

ISAAC B. JONES.

Witnesses:
J. C. CHALMER,
FRANCIS HARRIS.